United States Patent
Liang

(10) Patent No.: US 8,570,306 B2
(45) Date of Patent: Oct. 29, 2013

(54) EXTENDABLE TOUCH STYLUS

(75) Inventor: Shi-Xu Liang, Shenzhen (CN)

(73) Assignees: Shenzhen Futaihong Precision Industry Co., Ltd., Shenzhen (CN); FIH (Hong Kong) Limited, Kowloon (HK)

(*) Notice: Subject to any disclaimer, the term of this patent is extended or adjusted under 35 U.S.C. 154(b) by 738 days.

(21) Appl. No.: 12/791,050

(22) Filed: Jun. 1, 2010

(65) Prior Publication Data

US 2011/0115752 A1 May 19, 2011

(30) Foreign Application Priority Data

Nov. 13, 2009 (CN) .......................... 2009 1 0309719

(51) Int. Cl.
*G06F 3/033* (2013.01)

(52) U.S. Cl.
USPC ............................ 345/179; 401/99; 178/19.01

(58) Field of Classification Search
USPC ........... 345/179; 401/99, 100, 117; 178/19.01
See application file for complete search history.

(56) References Cited

U.S. PATENT DOCUMENTS

| 5,370,471 | A | * | 12/1994 | Kageyama et al. | 401/52 |
| 5,651,626 | A | * | 7/1997 | Chen | 401/104 |
| 6,461,074 | B2 | * | 10/2002 | Taylor | 403/378 |
| 6,752,557 | B1 | * | 6/2004 | Hsieh | 401/117 |
| 7,431,528 | B2 | * | 10/2008 | Liu | 401/258 |
| 8,284,174 | B2 | * | 10/2012 | Liang | 345/179 |
| 8,358,291 | B2 | * | 1/2013 | Liang | 345/179 |
| 8,436,838 | B2 | * | 5/2013 | Liang | 345/179 |
| 2003/0184529 | A1 | * | 10/2003 | Chien et al. | 345/179 |
| 2008/0170048 | A1 | * | 7/2008 | Hua | 345/179 |
| 2011/0094804 | A1 | * | 4/2011 | Liang | 178/19.01 |
| 2011/0139518 | A1 | * | 6/2011 | Liang | 178/19.01 |
| 2011/0181554 | A1 | * | 7/2011 | Liang | 345/179 |

* cited by examiner

*Primary Examiner* — Jason Mandeville
(74) *Attorney, Agent, or Firm* — Altis & Wispro Law Group, Inc.

(57) ABSTRACT

A touch stylus includes a first sleeve, a second sleeve, a stylus body, a first slide rod, and a second slide rod. The first sleeve defines a first assembling hole and the second sleeve defines a second assembling hole. The second sleeve is slidably received in the first assembling hole, the stylus body is slidably received in the second assembling hole. The first slide rod is secured with the first sleeve and slidably connects to the second sleeve. The second slide rod is secured with the second sleeve and slidably connects to the stylus body.

15 Claims, 5 Drawing Sheets

EXTENDABLE TOUCH STYLUS

BACKGROUND

1. Technical Field

The present disclosure relates to touch styluses, and particularly, to a touch stylus used in portable electronic devices.

2. Description of the Related Art

With the development of wireless communication and information processing technologies, portable electronic devices, such as mobile phones and personal digital assistants (PDAs), employing touch screens are now in widespread use.

Touch styluses for touching and inputting information on these touch screens are usually secured within the housing wall of the portable electronic device. The touch styluses are small or thin for meeting a miniaturized requirement of the portable electronic devices. However, because of their small size they are not comfortable to use.

Therefore, there is room for improvement within the art.

BRIEF DESCRIPTION OF THE DRAWINGS

Many aspects of the present touch stylus and the portable electronic device using the same can be better understood with reference to the following drawings. The components in the drawings are not necessarily drawn to scale, the emphasis instead being placed upon clearly illustrating the principles of the present touch stylus and a portable electronic device using the same. Moreover, in the drawings, like reference numerals designate corresponding parts throughout the several views.

DETAILED DESCRIPTION

Figure 1:
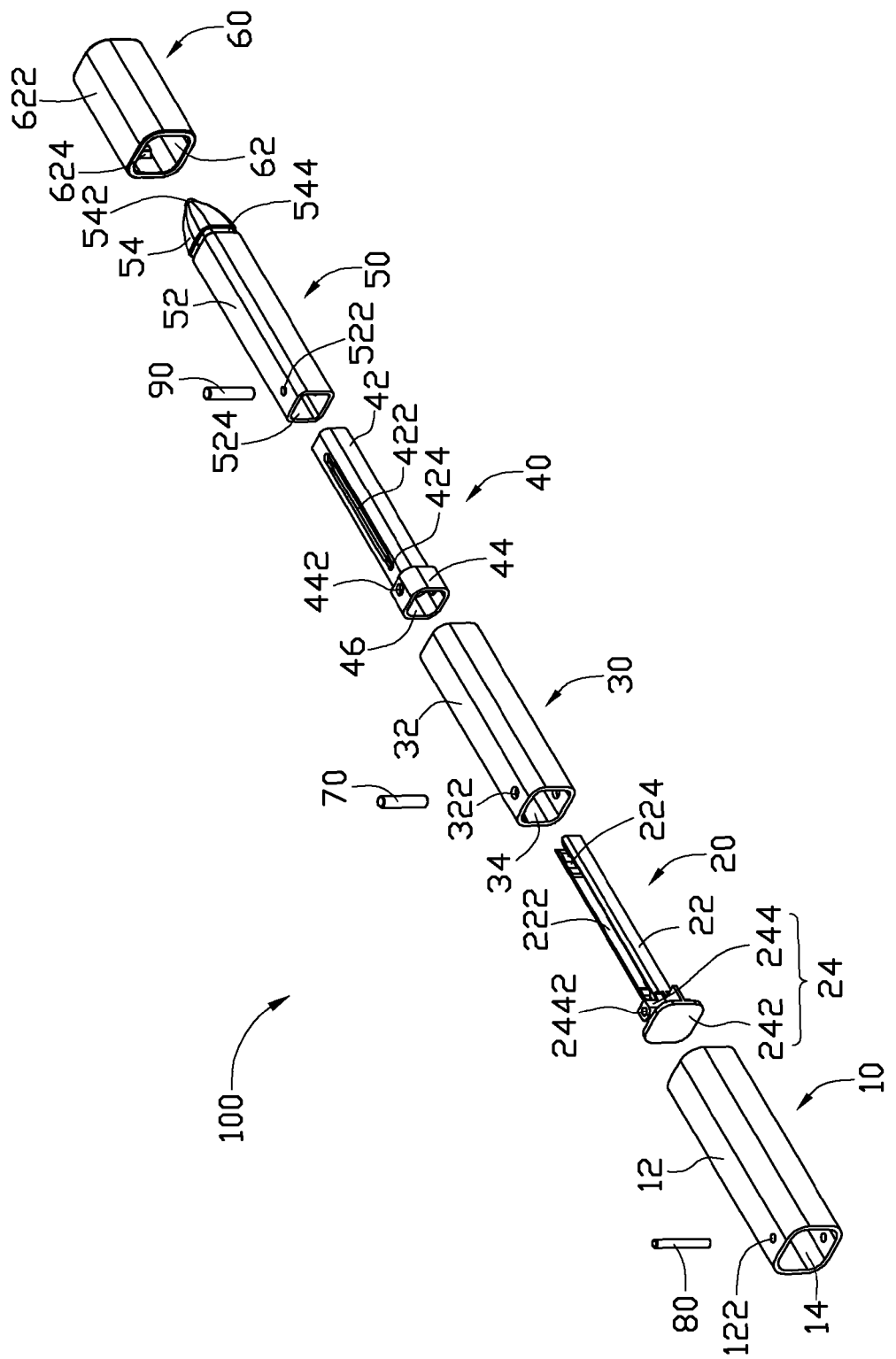
FIG. 1 is an exploded isometric view of an embodiment of a touch stylus.

FIG. 1 shows an exemplary embodiment of a touch stylus 100 used in a portable electronic device such as a mobile phone, or a personal digital assistant (PDA). The touch stylus 100 includes a first sleeve 10, a first slide rod 20, a second sleeve 30, a second slide rod 40, a stylus body 50 and a stylus cap 60.

The first sleeve 10 includes a first enclosure 12 enclosing a first assembling hole 14. The first enclosure 12 radially defines a first fixing hole 122 at one end. The first assembling hole 14 can receive the second sleeve 30 therein.

The first slide rod 20 can be assembled in the first assembling hole 14 of the first sleeve 10. The first rod 20 includes a rod portion 22 and a fixing portion 24 connecting one end of the rod portion 22. The rod portion 22 longitudinally defines a first slot 222. The first slot 222 forms a first clamping chamber 224 at each end, with the first clamping chamber 224 enclosed by two opposite arch surfaces (not labeled). A first post 70 can slide along the first slot 222 into one of the first clamping chambers 224, and clamped by the first clamping chamber 224. The fixing portion 24 includes a stopping plate 242 and an engaging block 244 located between the stopping plate 242 and the rod portion 22. The engaging block 244 defines a latching hole 2442. When the first slide rod 20 is received in the first assembling hole 14, a pin 80 can pass through the first fixing hole 122 and the latching hole 2442 to secure the first sleeve 10 with the first slide rod 20.

The second sleeve 30 can be received in the first assembling hole 14. The second sleeve 30 includes a second enclosure 32 correspondingly enclosing a second assembling hole 34. The second enclosure 32 radially defines a second fixing hole 322 to receive the second slide rod 40 therein.

The second slide rod 40 is stepped and includes a guiding section 42 and a fixing section 44 connecting with the guiding section 42. The guiding section 42 defines a second slot 422. The second slot 422 forms a second clamping chamber 424 at each end, and the second clamping chamber 424 has the same shape as the first clamping chamber 224. A second post 90 can slide along the second slot 422 and into one of the second clamping chambers 424, and can be clamped by the second clamping chamber 424. The fixing section 44 is larger than the guiding section 42 and can be inserted into the second assembling hole 34 of the second sleeve 30. The fixing section 44 radially defines a connecting hole 442 to engage the second post 90. The second slide rod 40 axially defines an accommodating chamber 46 from the fixing section 44 to the guiding section 42. The accommodating chamber 46 can receive the rod portion 22 of the first slide rod 20 therein. When the second slide rod 40 is received in the second assembling hole 34, the first post 70 can pass through the second fixing hole 322 and the connecting hole 442 to secure the second sleeve 30 with the second slide rod 40.

The stylus body 50 includes a body section 52 and a tip section 54 connecting with the body section 52. The body section 52 can be received in the second assembling hole 34 of the second sleeve 30. The body section 52 radially defines a third fixing hole 522 faraway with the tip section 54. The third fixing hole 522 is used to engage with the second post 90. The body section 52 axially defines a receiving chamber 524 extending from an end surface towards the tip section 54. The receiving chamber 524 can receive the guiding section 42 of the second slide rod 40 therein. The tip section 54 has a nib 542 contacting a screen of an electrical device. The tip section 54 defines an annular latching recess 544 at the periphery to latch with the stylus cap 60.

The stylus cap 60 is engageable with the stylus body 50 and defines an engaging cavity 62 at one end to receive the tip section 54 therein. Accordingly, a peripheral wall 622 is formed. The stylus cap 60 forms a latching flange 624 at the inner side of the peripheral wall 622, and the latching flange 624 can engage into the latching recess 544 of the tip section 54.

Figure 2:
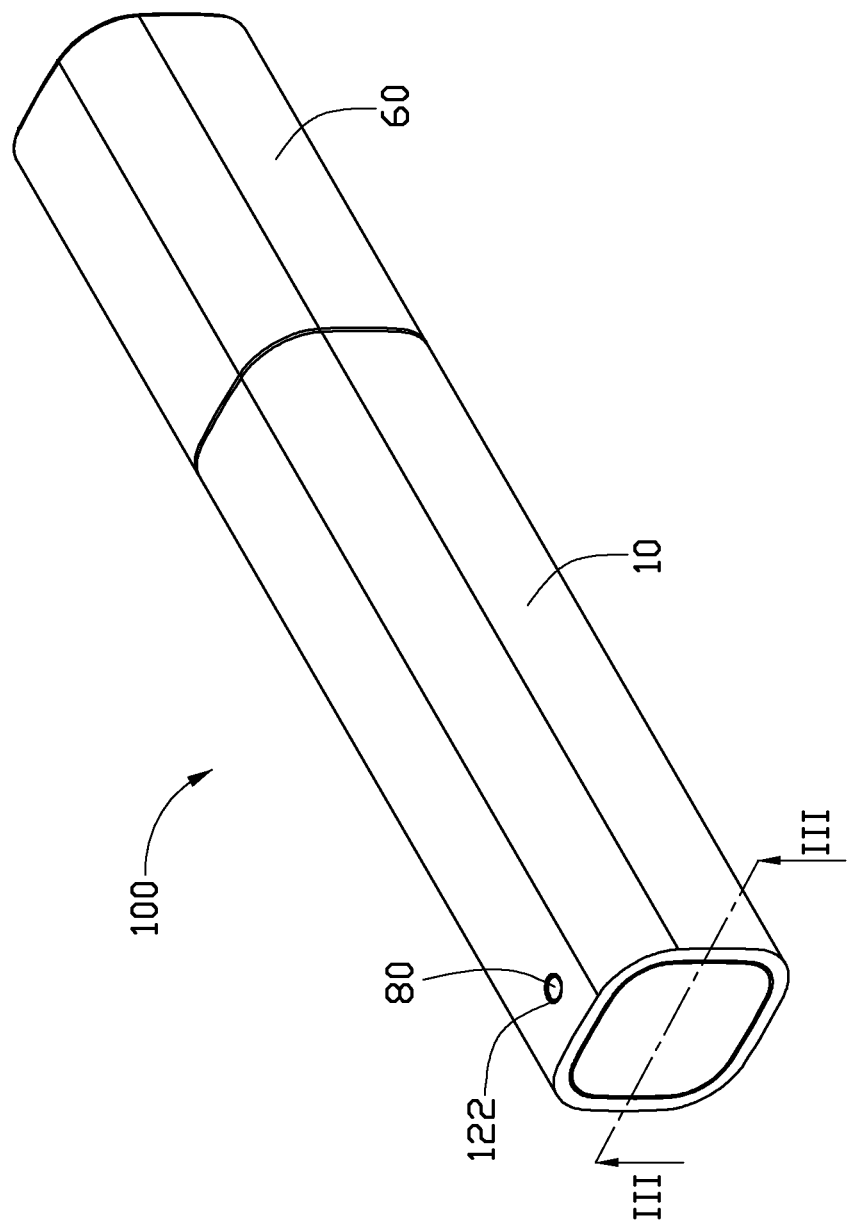
FIG. 2 is an assembled, isometric view of the touch stylus shown in FIG. 1.
Figure 3:
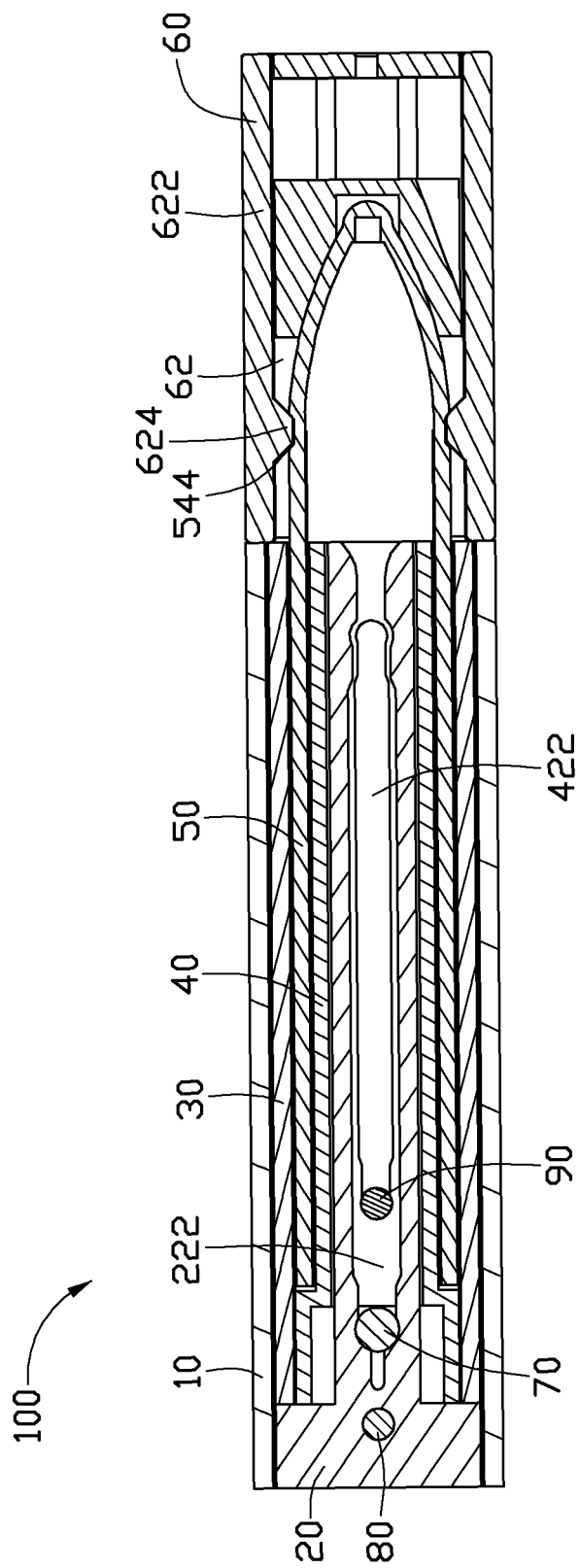
FIG. 3 is a cut-away view of FIG. 2.

To assemble the touch stylus 100, the guiding section 42 of the second slide rod 40 is placed into the receiving chamber 524 of the stylus body 50, and the body section 52 abuts the fixing section 44 of the second slide rod 40. The second post 90 is inserted into the third fixing hole 522 and passes through one of the second clamping chambers 424 of the second slot 422. Thus the second post 90 can slide along the second slot 422. Then, the second sleeve 30 is assembled with the body section 52 and the fixing section 44 received in the second assembling hole 34 of the second sleeve 30, and the tip section 54 exposed out of the second sleeve 30. Meanwhile, the second fixing hole 322 aligns with the connecting hole 442 of the fixing section 44. Then, the rod portion 22 of the first slide rod 20 is inserted into the accommodating chamber 46 of the second slide rod 40 and the engaging block 244 of the first slide rod 20 abuts against the second sleeve 30. A first post 70 is inserted into the second fixing hole 322 and passes through the connecting hole 442, of one of the first clamping chambers 224 of the first slot 222. The second sleeve 30 is secured with the second slide rod 40 and the first post 70 can slide along the first slot 222. Then, the first sleeve 10 is assembled. The second sleeve 30 and the fixing portion 24 of the first slide rod 20 are received in the first assembling hole 14. The first fixing hole 122 aligns with the latching hole 2442 of the engaging block 244, the pin 80 passes through the first fixing hole 122 and the latching hole 2442 to secure the first sleeve 10 with the first slide rod 20. The stopping plate 242 covers an end of the first assembling hole 14, and the tip section 54 also exposes out of the second sleeve 30. The stylus cap 60 covers the tip section 54 of the stylus body 50 the latching flange 624 securely latches into the latching recess 544. The touch stylus 100 is finally assembled (referring to FIGS. 2 and 3).

Figure 4:
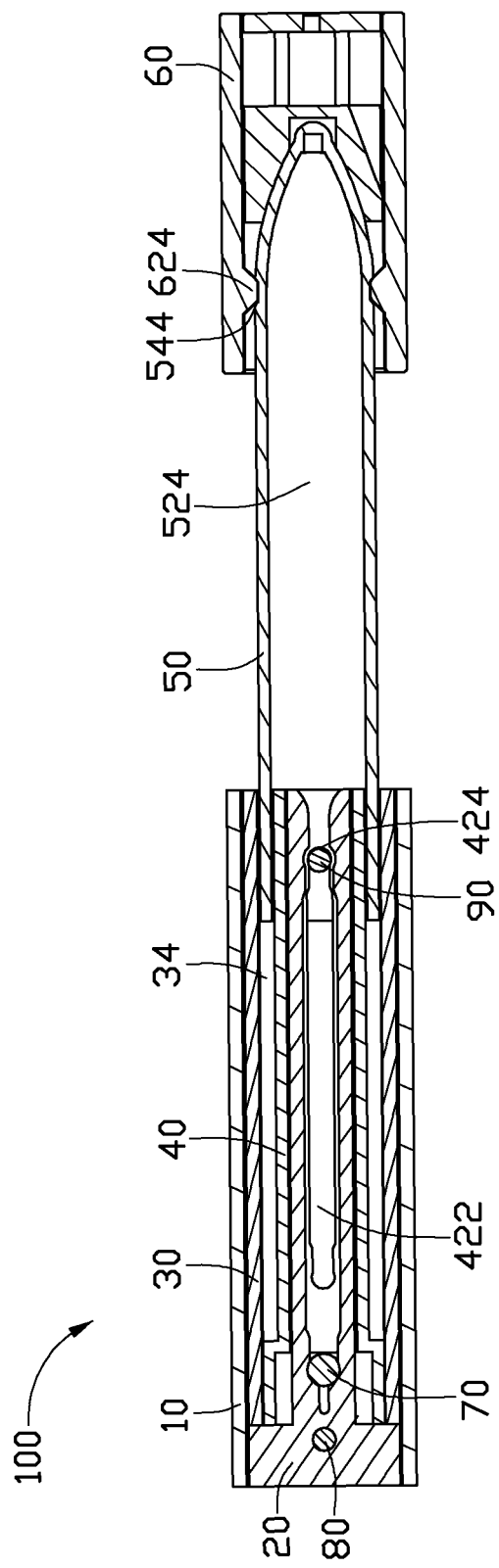
FIG. 4 is a cut-away view of the touch stylus shown in FIG. 2, when the touch stylus is partially extended.
Figure 5:
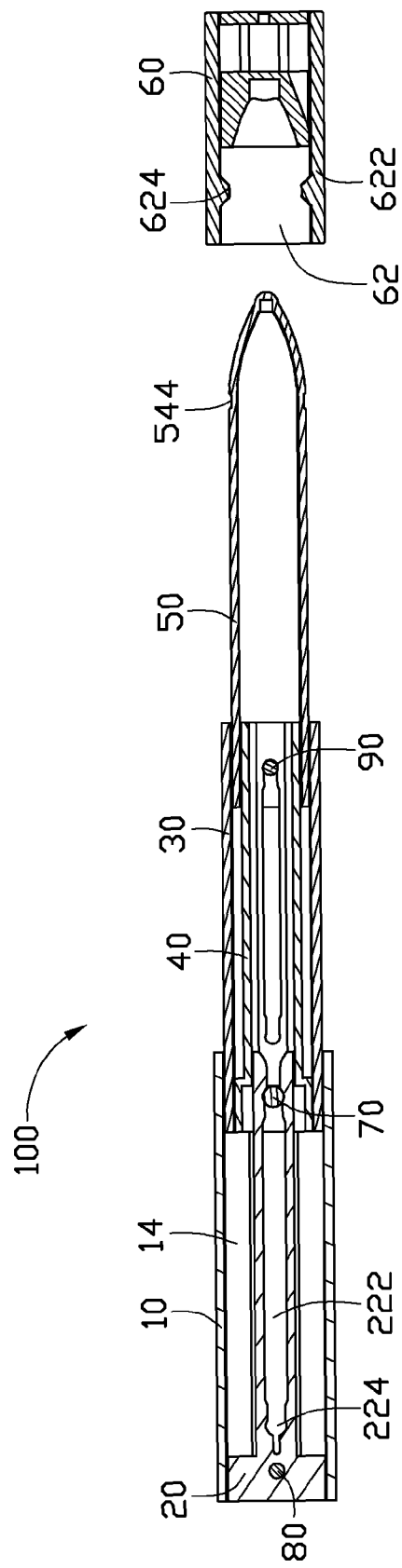
FIG. 5 is a cut-away view of the touch stylus shown in FIG. 2, when the touch stylus is fully extended.

Referring to FIGS. 4 and 5, in use of the touch stylus 100, the stylus cap 60 is pulled relative to the first sleeve 10. Due to the latching of latching flange 624 of the stylus cap 60 with the latching recess 544 of the stylus body 50, the stylus cap 60 enables the stylus body 50 to move simultaneously, and the second post 90 to slide relative to the second slot 422 of the second slide rod 40. Until the second post 90 slides into the other second clamping chamber 424 of the second slot 422 and can not move relative to the second slide rod 40, the second slide rod 40 moves together with the second post 90. Correspondingly, the second sleeve 30 moves together with the second slide rod 40, and the first post 70 moves relative to the first slot 222 of the first slide rod 20. Until the first post 70 slides into the other first clamping chamber 224 of the first slot 222, the stylus body 50 is extended relative to the first sleeve 10. The stylus cap 60 is pulled further and the stylus cap 60 separates from the tip section 54 of the stylus body 50. Thus, the body section 52 of the stylus body 50 and the second sleeve 30 can be withdrawn into the first sleeve 10.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A touch stylus, comprising:
a first sleeve including a first assembling hole;
a second sleeve slidably received in the first assembling hole, the second sleeve having a second assembling hole and defining a second fixing hole;
a stylus body slidably received in the second assembling hole;
wherein the touch stylus includes a first slide rod and a second slide rod, the first slide rod defines a first slot, the second slide rod defines an axial accommodating chamber and a radial connecting hole, the first slide rod is secured with the first sleeve and slidably connects to the second sleeve, the first slide rod is received in the second assembling hole and extends into the accommodating chamber, the second slide rod is secured with the second sleeve and slidably connect to the stylus body, a first post passes through the second fixing hole, the connecting hole and the first slot, the first post is capable of sliding along the first slot.

2. The touch stylus as claimed in claim 1, wherein the first slot has a first clamping chamber formed at each end to clamp the first post.

3. The touch stylus as claimed in claim 1, wherein the second slide rod defines a second slot, the stylus body defines a third fixing hole and a receiving chamber, the second slide rod extends into the receiving chamber, a second post, passing through the third fixing hole and the second slot, can slide relative to the second slot.

4. The touch stylus as claimed in claim 3, wherein the second slot has a second clamping chamber formed at each end to clamp the second post.

5. The touch stylus as claimed in claim 1, wherein the first sleeve defines radially a first fixing hole, the first slide rod defines a latching hole, a pin passes through the first fixing hole and the latching hole to secure the first sleeve and the first slide rod.

6. A touch stylus, comprising:
a first sleeve including a first assembling hole;
a second sleeve slidably received in the first assembling hole, the second sleeve having a second assembling hole and fixing a first post, the second sleeve defining radially a second fixing hole;
a stylus body slidably received in the second assembling hole, the stylus body having a receiving chamber and fixing a second post;
a first slide rod secured with the first sleeve, the first slide rod defining a first slot to slidably receive the first post;
a second slide rod secured in the second assembling hole and slidably received in the receiving chamber, the second slide rod defining a second slot to slidably receive the second post, the second slide rod defining a radial connecting hole and an axial accommodating chamber;
wherein the second slide rod is assembled in the second assembling hole, the first slide rod includes a rod portion, the rod portion defines longitudinally the first slot, the rod portion is inserted into the accommodating chamber, the first post passes through the second fixing hole, the connecting hole and the first slot.

7. The touch stylus as claimed in claim 6, wherein the first sleeve defines radially a first fixing hole, the first slide rod defines a latching hole, a pin passes through the first fixing hole and the latching hole to secure the first sleeve and the first slide rod.

8. The touch stylus as claimed in claim 7, wherein the first slot has a first clamping chamber formed at each end to clamp the first post.

9. The touch stylus as claimed in claim 8, wherein the first slide rod includes a fixing portion connecting to one end of the rod portion, the fixing portion includes a stopping plate and an engaging block, the stopping plate covers an end of the first assembling hole, the engaging block defines the latching hole.

10. The touch stylus as claimed in claim 8, wherein the second slide rod includes a guiding section, the guiding section defines longitudinally the second slot, the second slot has a second clamping chamber formed at each end to clamp the second post.

11. The touch stylus as claimed in claim 10, wherein the second slide rod includes a fixing section connecting with the guiding section, the fixing section defines the connecting hole, the accommodating chamber extends axially from the fixing section to the guiding section.

12. The touch stylus as claimed in claim 10, wherein the stylus body includes a body section and a tip section connecting to one end of the body section, the body section is received in the second assembling hole, the tip section is exposed from the second sleeve.

13. The touch stylus as claimed in claim 12, wherein the body section defines radially a third fixing hole, the receiving chamber extends axially from the body section toward to the tip section, the guiding section is received in the receiving chamber, the second post passes through the third fixing hole and the second slot.

14. The touch stylus as claimed in claim 12, wherein the touch stylus includes a stylus cap to cover the tip section.

15. The touch stylus as claimed in claim 14, wherein the tip section defines an annular latching recess, the stylus cap defines an engaging cavity, the engaging cavity forms an annular latching flange at the inner side to latch with the latching recess.

* * * * *